United States Patent
Johanssen

(10) Patent No.: US 7,886,897 B2
(45) Date of Patent: Feb. 15, 2011

(54) CONVEYOR BELT COVER FOR BULK MATERIAL HANDLING SYSTEMS

(75) Inventor: Thor Johanssen, Norval (CA)

(73) Assignee: Thor Global Enterprises Ltd., Mississauga (CA)

( * ) Notice: Subject to any disclaimer, the term of this patent is extended or adjusted under 35 U.S.C. 154(b) by 75 days.

(21) Appl. No.: 12/486,849

(22) Filed: Jun. 18, 2009

(65) Prior Publication Data

US 2009/0321224 A1 Dec. 31, 2009

Related U.S. Application Data

(60) Provisional application No. 61/073,411, filed on Jun. 18, 2008.

(51) Int. Cl.
*B65G 21/08* (2006.01)
(52) U.S. Cl. .................. 198/860.5; 198/860.3; 198/818
(58) Field of Classification Search ............. 198/860.3, 198/860.5, 818
See application file for complete search history.

(56) References Cited

U.S. PATENT DOCUMENTS

| | | | | |
|---|---|---|---|---|
| 2,665,795 A * | 1/1954 | Holwick | ................... | 198/836.1 |
| 3,292,773 A * | 12/1966 | Keehart et al. | ........... | 198/860.5 |
| 3,878,936 A * | 4/1975 | Niggemyer | .............. | 198/860.5 |
| 4,166,528 A * | 9/1979 | Renner | ........................ | 198/825 |
| 4,358,011 A * | 11/1982 | Buschbom et al. | ........ | 198/860.5 |
| 4,586,599 A * | 5/1986 | Walters | .................... | 198/860.3 |
| 4,714,151 A * | 12/1987 | Campbell et al. | ........ | 198/860.5 |
| 5,129,508 A * | 7/1992 | Shelstad | ................... | 198/860.3 |
| 5,400,897 A * | 3/1995 | Doyle | ....................... | 198/860.5 |
| 5,947,266 A * | 9/1999 | Rionde | .................... | 198/860.3 |
| 6,634,490 B2 * | 10/2003 | Fischer et al. | ............ | 198/860.5 |
| 7,743,914 B2 * | 6/2010 | Nagahama et al. | ....... | 198/860.3 |
| 2005/0178643 A1 * | 8/2005 | Simoens et al. | .......... | 198/860.3 |

* cited by examiner

*Primary Examiner*—James R Bidwell
(74) *Attorney, Agent, or Firm*—Neil D. Gershon

(57) ABSTRACT

A protective cover for deployment within the interior of a conveyor truss of a conveyor belt-driven bulk material handler. The protective cover comprises an apical support member configured for resilient attachment to an upper, central truss member of the conveyor truss such that the apical support member hangs above the conveyor belt when the cover is deployed. The cover comprises a pair of parallel support members, each configured for fixed attachment to opposite lateral conveyor truss members. The apical support member and the parallel support members together form a triangular arrangement of support members within the conveyor truss when the cover is deployed. Also provided is a rectangular sheet of protective material having a means for attachment of opposite sides thereof to a corresponding member of the pair of parallel support members. The rectangular sheet is centrally stretched over the apical support member to form a triangular cover structure disposed above the conveyor belt when the cover is deployed.

18 Claims, 10 Drawing Sheets

CONVEYOR BELT COVER FOR BULK MATERIAL HANDLING SYSTEMS

This application claims priority from provisional application Ser. No. 61/073,411, filed on Jun. 18, 2008. The entire contents of this application are incorporated herein by reference.

BACKGROUND

Embodiments described herein relate to conveyor belt-driven bulk or aggregate material handling systems, and more particularly, to systems for protecting the conveyor belt and bulk materials transported thereon, from the outdoor elements.

Bulk or aggregate material handling is an engineering field that relates to the design of equipment used for the transportation of materials such as ores or grains in loose bulk form from a source to a destination. Bulk material handlers include, among other things, moveable items of machinery such as conveyor belts, stackers, reclaimers, bucket elevators, shiploaders, unloaders and various shuttles, hoppers and diverters. These material handlers are typically deployed at facilities such as construction sites, mine sites, ports, stockyards, storage silos, power stations and refineries.

Bulk handling systems that include conveyor belts typically have such conveyor belts housed within elongated conveyor trusses. Depending on the characteristics of the bulk materials being handled, it may be advantageous or desirable to prevent the bulk material from exposure to wind and precipitation during the conveyance of the bulk material. For example, excessive wind may cause the bulk material to blow off conveyor belts and precipitation may damage valuable bulk materials such as grains to a greater extent when increased surface area of the bulk material is exposed on conveyor belts. It is known to provide such protection by enclosing the conveyor belt portion of bulk materials handling systems with covers constructed of corrugated steel, for example, by welding or riveting such covers to the trusses that house the conveyors. These covers however, add much weight to the truss that houses the conveyor belt and therefore introduce added expense in materials and construction as well as potentially destabilizing the conveyor truss with the excess weight. Furthermore, these enclosures may restrict convenient access to the conveyor for routine maintenance.

SUMMARY

According to one aspect of the present invention, there is provided a removable protective cover for deployment over a conveyor belt, said protective cover comprising:

(a) a plurality of individual flexible rectangularly shaped sheet members having longitudinal ends and free transverse side edges, the side edges of each rectangularly shaped sheet member being adapted to be, at their respective longitudinal ends, in juxtaposition with one another to form a substantially continuous cover for covering said conveyor belt;

(b) said plurality of sheet members each having a longitudinally extending centrally located support means extending substantially the longitudinal length of each sheet member and with adjacent sheet members having said centrally located support means substantially in alignment with each other;

(c) individual ones of said sheet members being capable of being removably separated from an adjacent one of said sheet members along at least one transverse side edge of the sheet member to permit access to one section of said conveyor belt on at least one side thereof in the area covered by an individual sheet member;

(d) a plurality of spaced-apart tensioning support members configured for resilient and tensioning attachment to spaced-apart locations along an upper truss member, each of said tensioning support members being adapted to support spaced-apart sections of said individual sheet members via said upper central truss member, said tensioning support members being positioned above said conveyor belt when said cover is deployed over said conveyor;

(e) a pair of parallel support members, each configured for fixed attachment to a frame member;

(f) said tensioning support members and said parallel support members together forming a triangular geometry to define a supporting arrangement over said conveyor belt when said cover is deployed; and (g) said rectangular sheet members having a means for attachment of opposite sides thereof to a corresponding member of said pair of parallel support members, said rectangular sheet members being centrally retained at an apex of said triangular support arrangement by said tensioning support member to form a triangular cover structure disposed above said conveyor belt when said cover is deployed.

In the above embodiment, desirably said tensioning support member and said pair of parallel support members are tubular members; further, preferably said rectangularly shaped sheet members have a plurality of apical openings to expose said tensioning support members when said cover is deployed, said apical openings providing access to said tensioning support members for resilient attachment to said upper central truss member; still further, desirably each of said rectangular sheet members includes a plurality of equally spaced apical openings for said resilient attachment of said apical support member to said upper central truss member; desirably, in the above embodiment, said resilient attachment to said upper central truss member includes a plurality of drawbar springs, and further said means of attachment of said rectangular sheet members comprise parallel sleeves formed in and disposed along the opposing lengths of said rectangular sheet members, said parallel sleeves configured for insertion of said tubular members.

In the above embodiment, preferably said rectangular sheet members have a plurality of side openings in each of said parallel sleeves, said side openings providing access to said parallel support members for said fixed attachment of said parallel support members to opposite lateral conveyor truss members; said parallel support members have a plurality of eye-hooks attached thereto, said protective cover having opposite lateral conveyor truss members with rings attached thereto, and said fixed attachment is made by hooking eye hooks to rings; still further, said rectangular sheet members are centrally retained at an apex by stretching of said rectangular sheet over said support members; desirably, the rectangular sheet members are centrally retained at said apex by insertion of said support members into an apical sleeve centrally disposed in said rectangular sheet members; preferably said apical sleeve is on the inner surface of said rectangular sheet members and said support members form an apex below said protective sheet. Still further, desirably the apical sleeve is on the outer surface of said rectangular sheet members and said apical support members form an apex above said protective sheet.

In a still further preferred embodiment, the frame member is a conveyor truss which is a triangular truss and an apical support member which is configured for spring-biased attachment to a truss member located at the apex of said triangular support arrangement; said conveyor truss is a rectangular truss that includes a truss member for mounting centrally above said conveyor belt and wherein said apical support member is configured for spring-biased attachment to said centrally disposed truss member; the angle formed between the planes defined by the apical support member and the two parallel support members creates and obtuse angle, which can be e.g. between 130-140 degrees.

Preferred embodiments of the present invention provide a protective cover for deployment above the conveyor belt of a bulk materials handler. The protective cover includes an apical support member configured for resilient attachment to an upper, central truss member of the conveyor truss. When attached, the apical support member hangs centrally above the conveyor belt. The cover also includes a pair of parallel support members, each configured for fixed attachment to opposite lateral conveyor truss members. These parallel support members together with the apical support member form a triangular arrangement of support members inside the conveyor truss. A rectangular sheet of protective material is centrally retained at an apex formed by the apical support member and has means for attachment of its opposing sides to the parallel support members. A triangular cover structure is thus formed and is disposed above said conveyor belt to protect the conveyor belt and materials conveyed thereon from exposure to wind and precipitation.

In a further preferred embodiment, the protective cover further includes a tensioning and mounting means adapted to tension said protective cover laterally of a conveyor system, said tensioning and mounting means comprising a pair of arms rotatably connected to one another, one arm being fixedly secured to each of said parallel support members, the other arm being adapted to be attached to a conveyor truss member.

Preferred embodiments also provide for a kit of parts of one or more of the protective covers described above. The kit includes instructions for assembly of the protective cover within the interior of a conveyor truss of a conveyor belt-driven bulk material handler, including instructions for assembly of a series of protective covers along the length of a conveyor truss of a bulk material handler.

Preferred embodiments also provide for a system for protecting bulk materials from exposure during handling. The system includes a conveyor belt-driven bulk materials handler with a conveyor truss and a protective cover as previously described. The cover is deployed above the conveyor belt within the interior of the conveyor truss or on the exterior of the conveyor truss by attaching the cover to conveyor truss members or projecting truss members extending from the top or sides of the conveyor truss.

DESCRIPTION OF PREFERRED EMBODIMENTS

Figure 1:
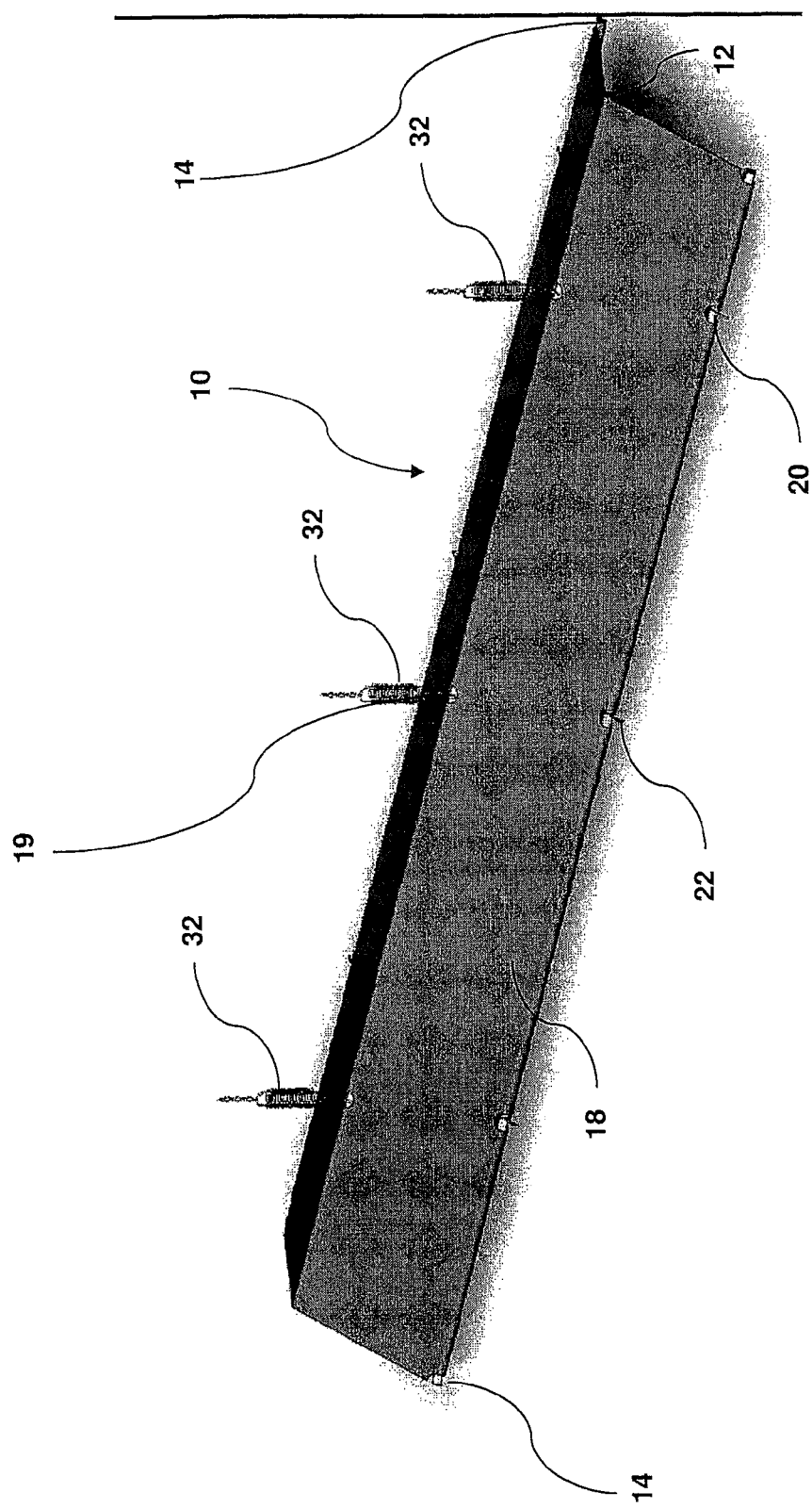
FIG. 1 is a side perspective view of a segment of the protective cover according to one embodiment of the invention.
Figure 2:
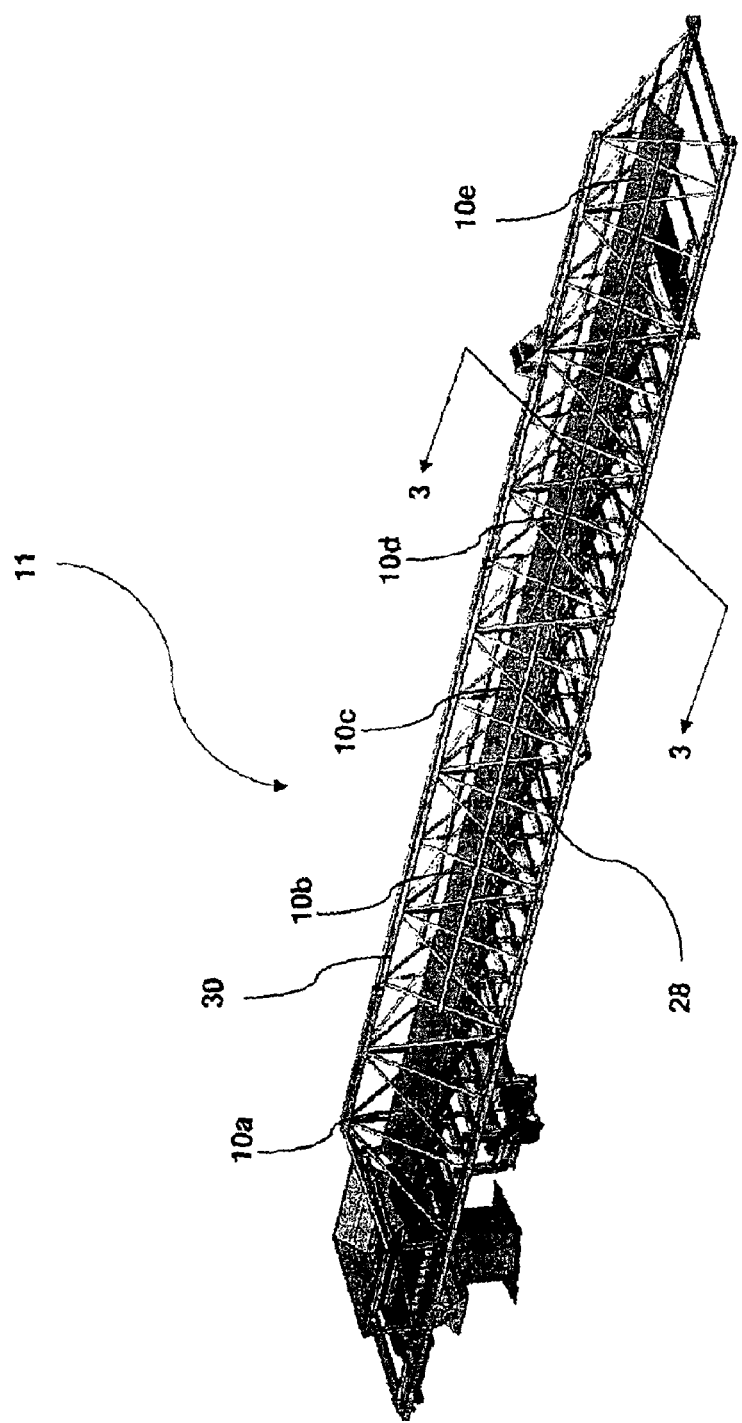
FIG. 2 is a side perspective view of a series of five protective covers deployed along the length of a triangular conveyor truss according to one preferred embodiment of the invention.
Figure 3:
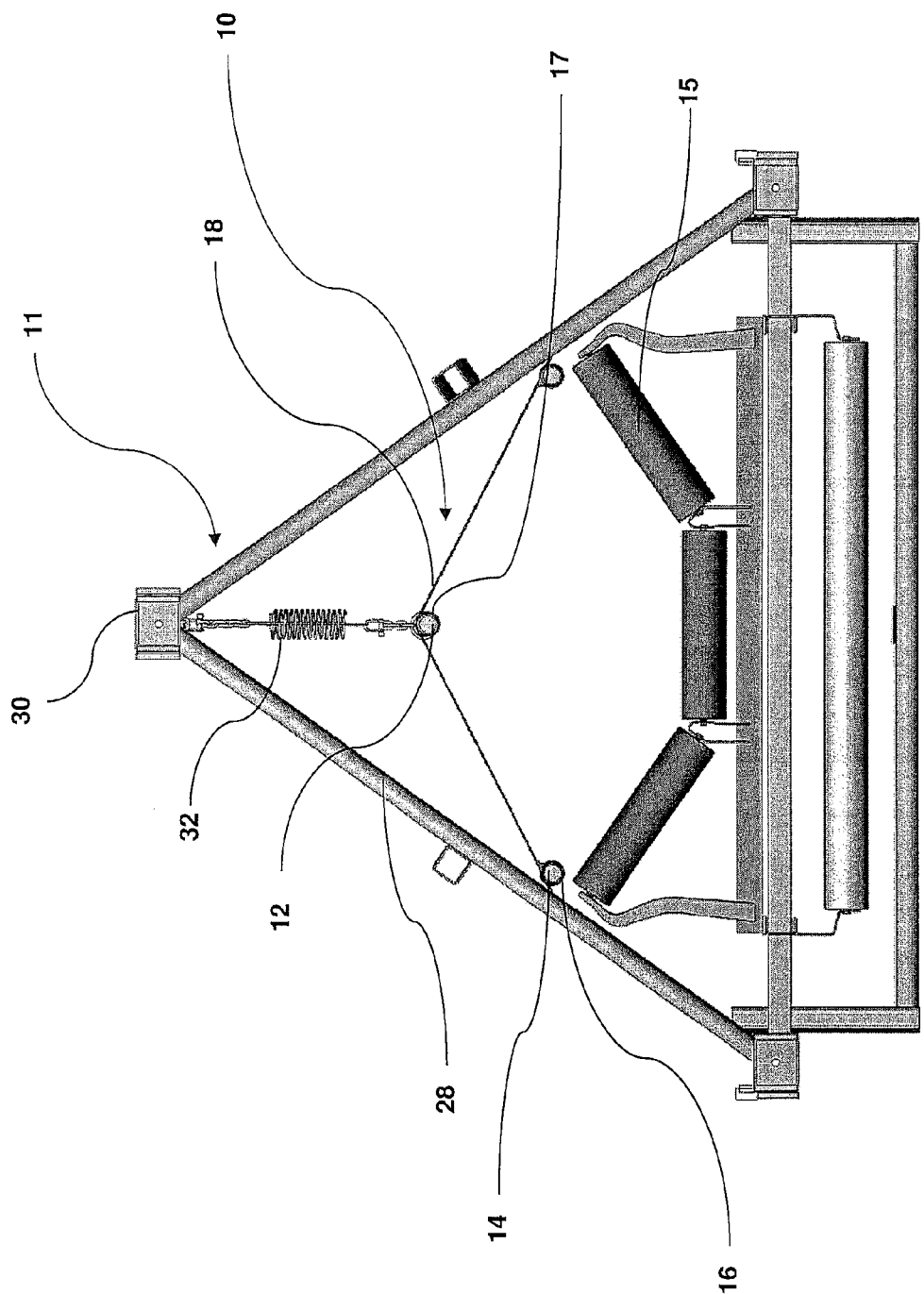
FIG. 3 is a cross sectional view taken along line 3-3 of FIG. 2.
Figure 4:
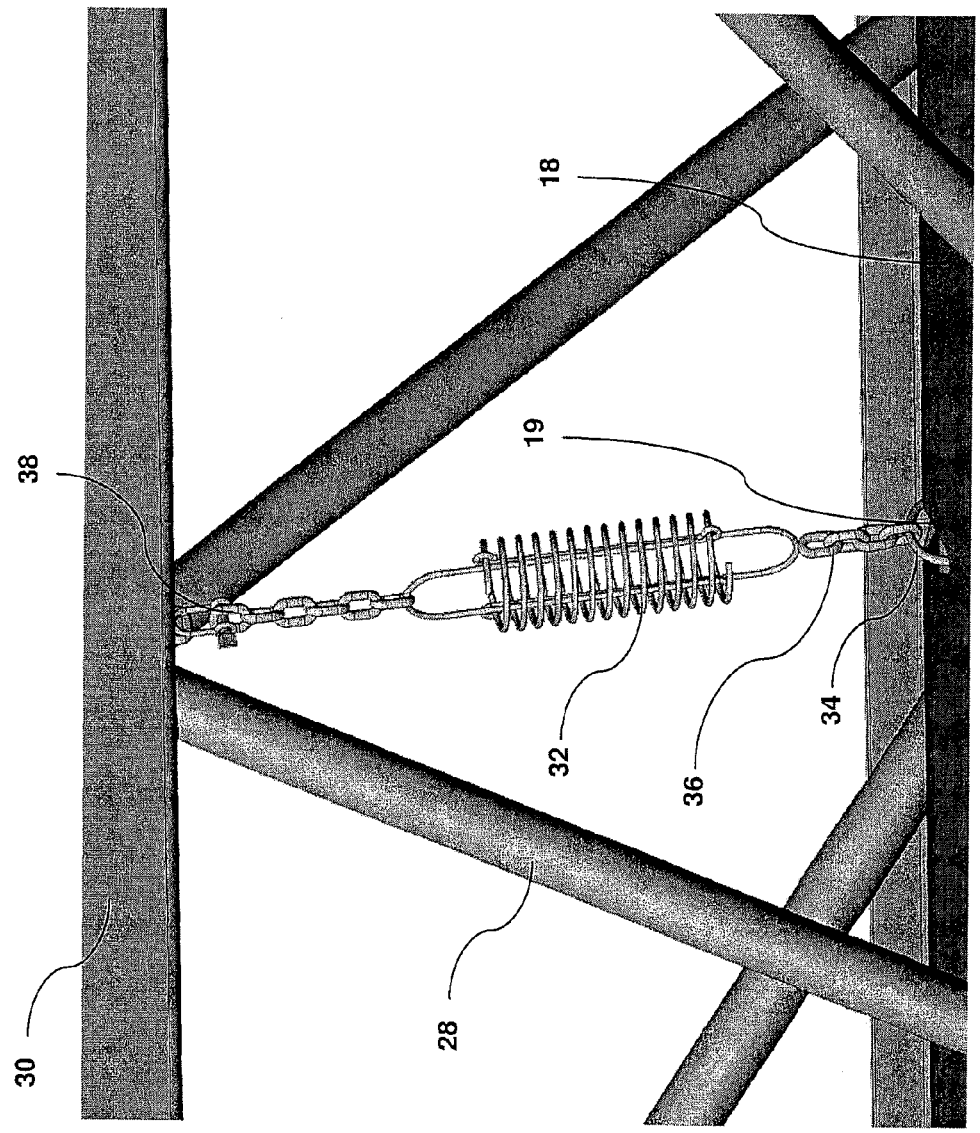
FIG. 4 is a cut-away side perspective view showing means for resilient attachment of the protective cover to an upper central truss member according to one preferred embodiment of the invention.
Figure 5:
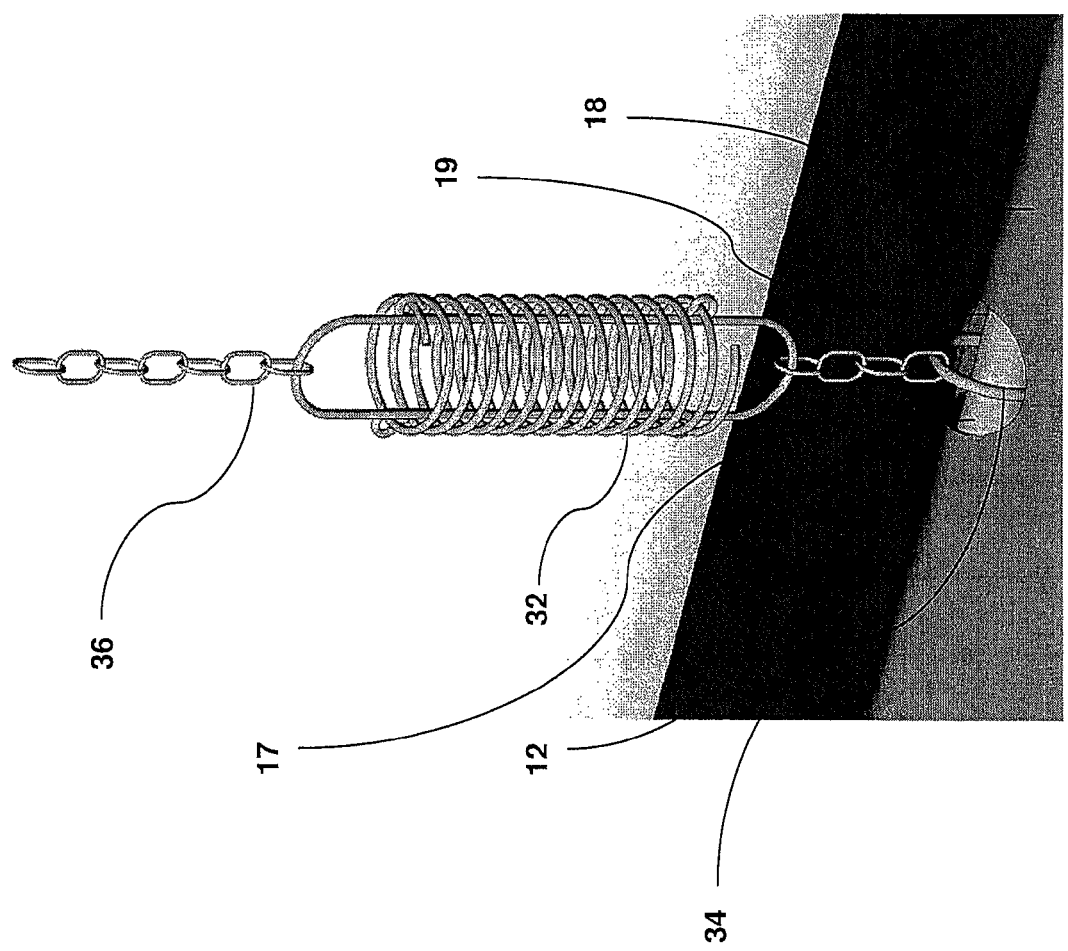
FIG. 5 is a top perspective view of a drawbar spring attached to the apical support member according to one preferred embodiment of the invention.
Figure 6:
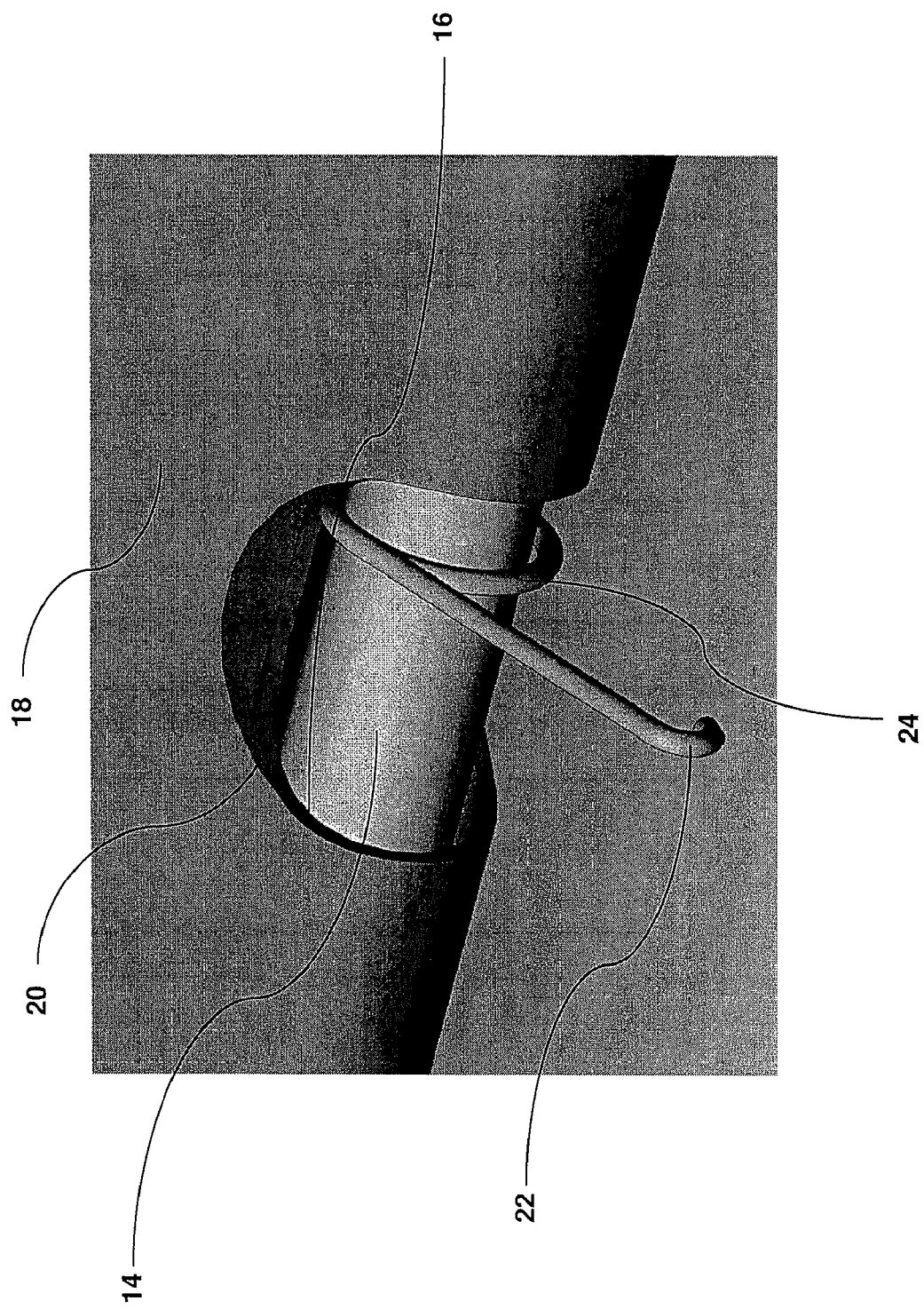
FIG. 6 is a cut-away side perspective view of a preferred embodiment of the present invention showing a portion of a parallel support member contained within a parallel sleeve of protective material that forms the protective cover. Also shown is a side opening with an eye hook extending therefrom.
Figure 7:
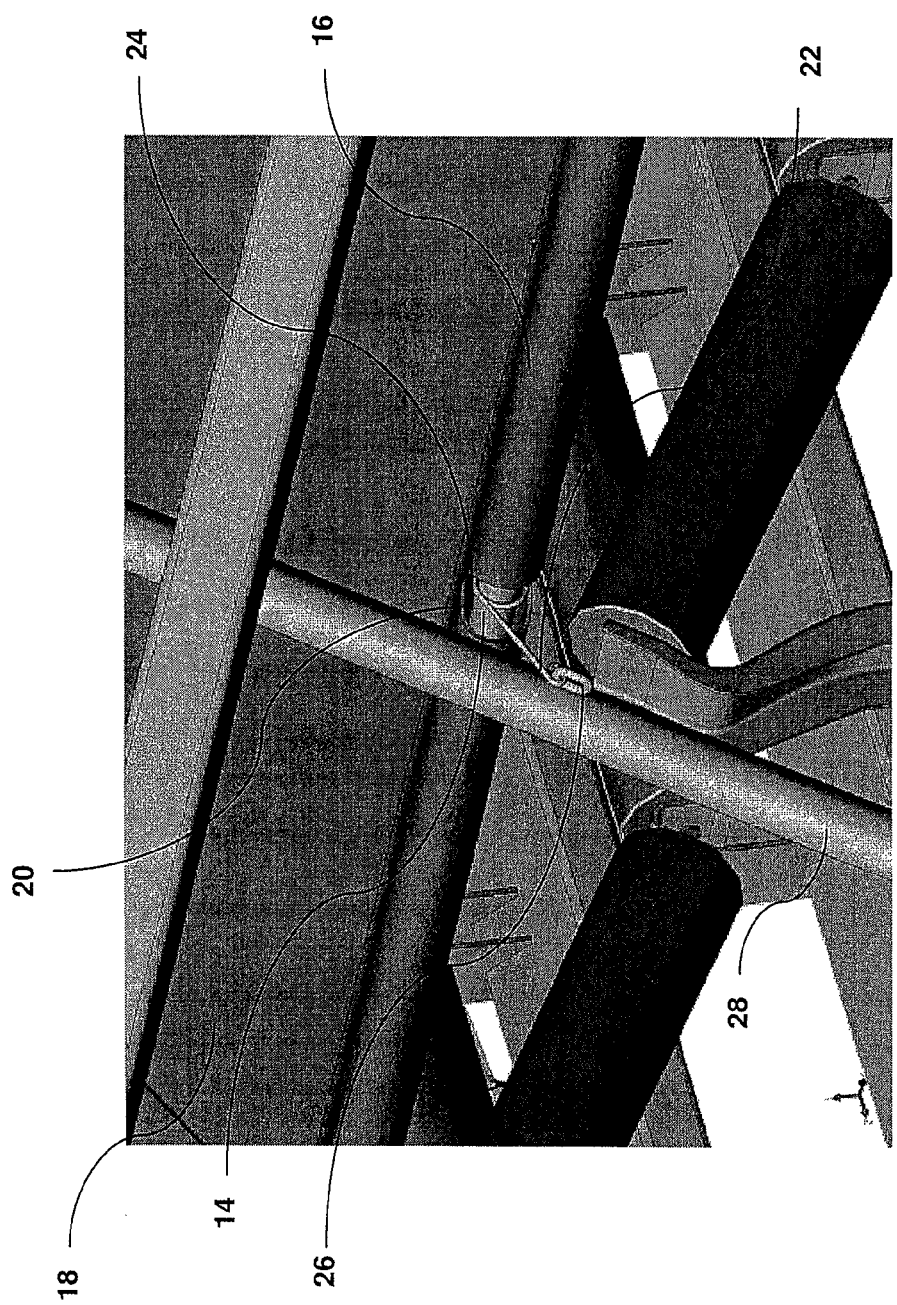
FIG. 7 is a cut-away side perspective view of a preferred embodiment of the present invention showing a portion of parallel support member contained within a parallel sleeve of protective material that forms the protective cover. Also shown is a side opening with an eye hook extending therefrom and coupled to a hoop attached to a lateral conveyor truss member.
Figure 8:
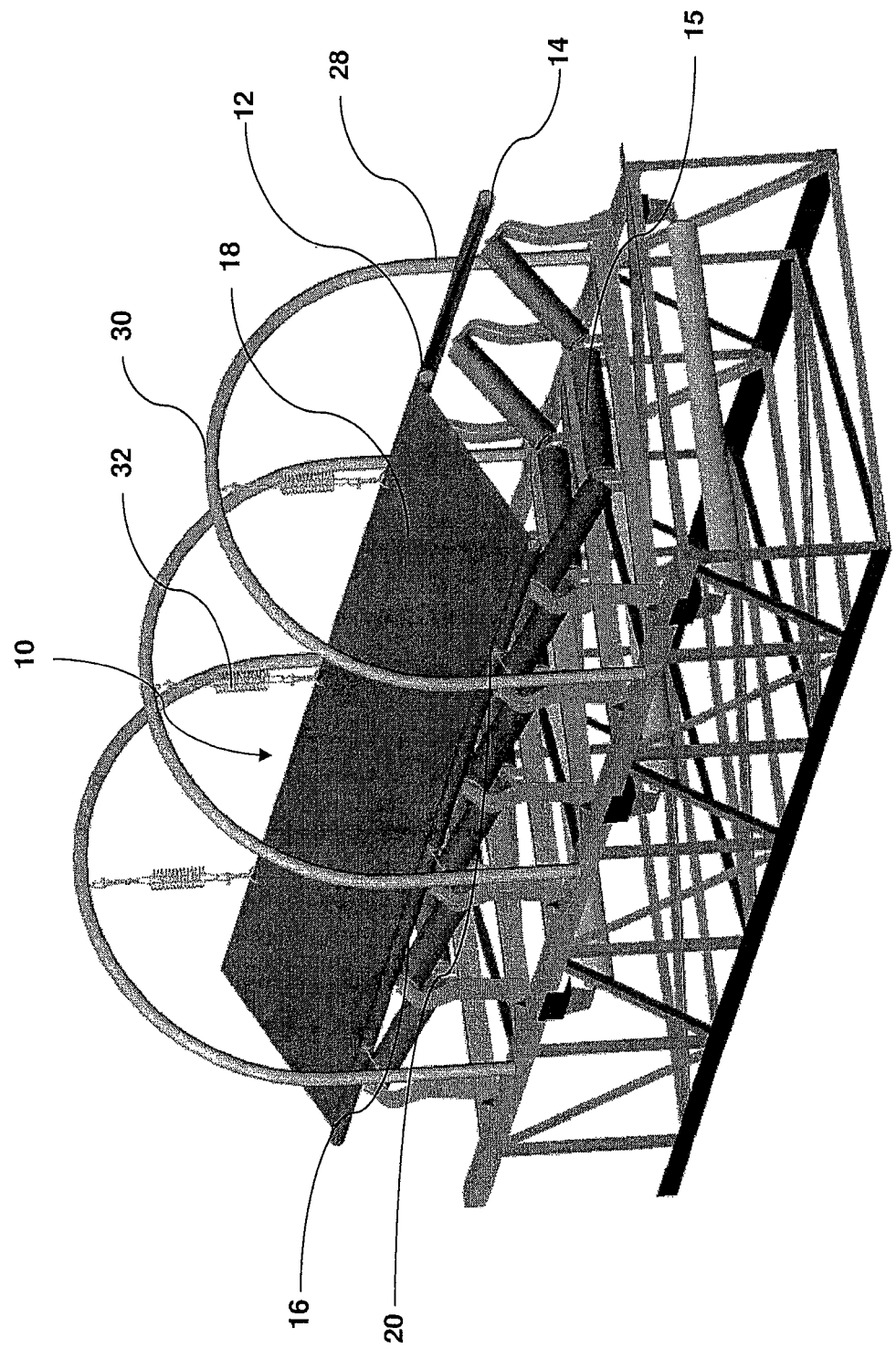
FIG. 8 is a front perspective view of a preferred embodiment of the present invention showing attachment of the protective cover to a standard rectangular conveyor truss.

Referring to FIGS. 1 through 9, there is shown a preferred embodiment of a protective cover 10, for installation above a conveyor belt 11 of a bulk materials handler. In preferred embodiments, the protective cover has an elongate tubular apical support member 12, and a pair of parallel elongate tubular side support members 14. In FIGS. 2 and 3, the protective cover 10 is shown in as deployed within a triangular conveyor truss. The protective cover 10 of the present invention may also be readily deployed within or over other types of conveyor trusses such as a rectangular conveyor truss as shown in FIG. 8.

Figure 1A:
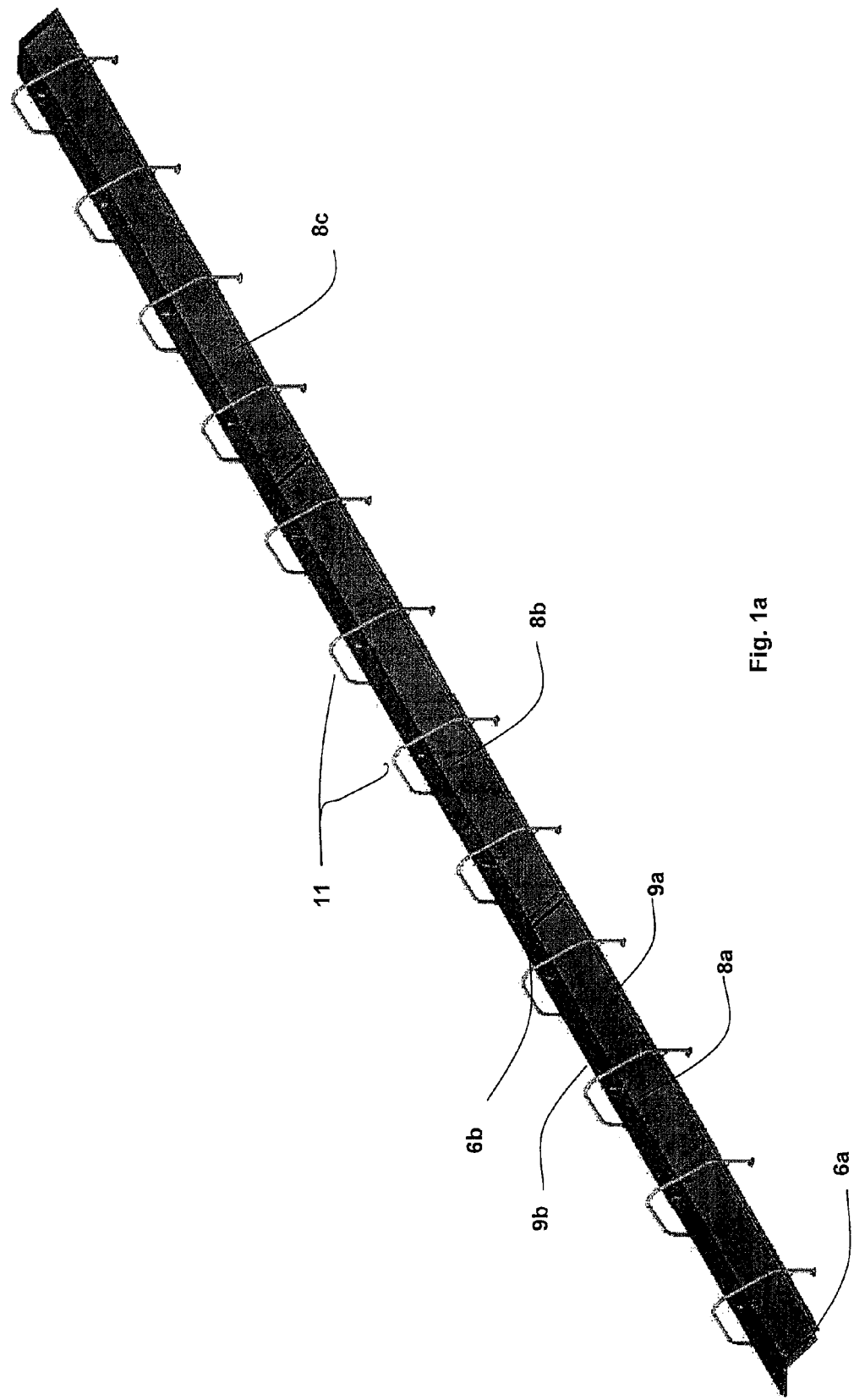
FIG. 1A is a perspective view of the protective cover of the invention showing a plurality of the individual flexible rectangularly shaped sheet members as it would appear over a typical conveyor.

With reference to FIG. 1A, the protective cover is made up of a plurality of individual rectangularly shaped sheet members which extend from one lateral side of the cover system to the opposed lateral side. Each of these plurality of individual sheet members, indicated by reference numbers 8a, 8b, 8c, etc. has opposed longitudinal ends 9a and 9b and a pair of free transverse side edges 6a and 6b. As shown in FIG. 1, the transverse side edges of one rectangularly shaped sheet member 8 abut or are in juxtaposition with the adjacent sheet member 8 in order to form a substantially continuous cover system as illustrated in FIG. 1. In such an arrangement, the transverse or lateral side edges of one sheet can be displaced relative to an adjacent sheet in order to gain access to different areas of a conveyor system located beneath the overall cover.

In one preferred embodiment, the parallel support members 14 are of the same size and construction and are therefore substantially identical. Furthermore, the apical support member 12 may also be substantially equivalent in size and construction to the parallel support members 14 thereby providing convenience in manufacturing the parts of the protective cover 10. In the embodiment shown, the apical support member 12 and the parallel support members 14, are tubular members, although other means for supporting the protective cover are possible, such as for example, rigid rods, rigid wires, ropes or other such means for supporting the cover in alternative embodiments of the invention. The tubular support members 12 and 14 of the presently described preferred embodiment may be formed of rigid metal such as steel or aluminium for example. In at least some preferred embodiments, the diameter of these tubular support members 12 and 14 is between about 1.5 to about 2.5 inches, and may for example be about two inches. The angle formed by the planes defined by each of the parallel support members 14 and the apical support member 12 in at least some preferred embodiments is about 105 to 115 degrees, and may for example be about 110 degrees. This range of angles is suitable for covering most typical sizes of conveyor belts of bulk materials handlers while having enough of a slant to allow water to slew off the edges of the protective cover 10. In at least some preferred embodiments the protective material 18 to be tightly stretched over the apical support member 12 to prevent loose folds of the cover 10 from hanging down and trapping portions of the bulk material being transferred via the conveyor belt 15. In other preferred embodiments, the apical support member 14 is retained within an apical sleeve 17 formed in the protective material 18 or formed by separate material connected to a central longitudinal portion of the protective material 18. Such connections made between materials can be effected by stitching or other means known to those skilled in the art.

When deployed, the protective cover 10 hangs above the conveyor belt 15 of the bulk materials handler, thereby protecting the bulk materials traveling along the length of the conveyer truss 11 from outdoor elements such as wind, precipitation and ultraviolet light.

Each of the parallel support members 14 of this embodiment are enclosed within a respective elongate parallel sleeve 16 formed along a respective peripheral edge in the rectangular protective material 18. The protective material 18 should be chosen appropriately to protect the bulk materials from outdoor elements. Lightweight and inexpensive flexible materials such as nylon, polyester or high density polyethylene for example, may be used in the construction of the protective material 18. Coatings such as polyurethane may also be added to increase water resistance of the protective material 18.

In one preferred embodiment, Novathene® high density polyetheylene (HDPE) scrim, a reinforced polypropylene membrane is used as the protective material 18. Typical specifications of this material are appropriate for the protective material 18 and include a nominal weave of 12 by 9 ppi (47×35 tapes per 10 cm); an average coating of 1.5 mil, two sides (35 g/m$^2$); weight of 162 g/m$^2$; and a thickness of 0.25 mm. The performance specifications of this material include a grab tensile strength of warp 175 lbs, 778 N, weft 155 lbs, 689 N; a tongue tear strength of warp 50 lbs, 272 N, weft 55 lbs, 244 N; Mullen burst of 310 psi, 2139 kPa; and accelerated ultraviolet weathering of greater than 80% strength after 2000 hours of UV exposure.

The parallel sleeves 16 serve as the means for attachment of the protective material 18 to the parallel support members 14. The construction of a parallel sleeve 16 of this embodiment is shown in greater detail in FIG. 6 where it is shown that the parallel sleeves 16 are formed as part of the rectangular sheet at opposite sides along the length of the protective material 18. The parallel sleeves 16 may be formed in any convenient and advantageous manner known to those skilled in the art such as by stitching a folded over portion of a side of the protective material 18 or by attaching a separate section of material as a continuous piece or sections of material as separate strips. The outer portions of the parallel sleeves 16 that encase the parallel support members 14 have, in this embodiment, regularly spaced side openings 20. These side openings 20 serve the function of providing access to the parallel support members 14 while they are encased in the parallel sleeves 16. This access allows for attachment of a fastener such as, for example, an eye hook 22 which is shown in greater detail in FIGS. 6 and 7. One with ordinary skill in the art will recognize that use of other fasteners or clamps will be appropriate in other embodiments of the present invention. The eye hook 22 of the present embodiment may be removably attached to the parallel support member by means of a ring closure 24 which may be stretched open but is biased towards closure of the ring. Having a removable fastener is advantageous because removal of the fastener prevents tangling of the protective material 18 in the ring closure 24 during the process of inserting or removing a parallel support member 14 from its parallel sleeve 16. In such embodiments, the eye hook 22 is designed to capture a hoop 26 attached to a lateral conveyor truss member 28, thereby effecting attachment of a parallel support member 14 to a corresponding lateral conveyor truss member 28. In this preferred embodiment, the hoop 26 is permanently attached to the lateral conveyor truss member 28 such as, for example, by welding of the hoop 26 to the lateral conveyor truss member 28 in a position that avoids contact with extraneous equipment or the internal machinery that drives the conveyor belt 15.

In various preferred embodiments, other means for attachment of the rectangular sheet of protective material 18 to the parallel support members 14 can be used, such as, for example, construction of grommet holes into the sheet 18 would allow for a common hook-and-grommet style of attachment of the sheet 18 to the parallel support members 14 if they were equipped with rigid hooks instead of hoops 26.

The center of the rectangular sheet of protective material 18 has a plurality of apical openings 19 that are positioned to allow access to the apical support member 12 when the sheet 18 is stretched over the apical support member 12 or fitted within an apical sleeve 17 of said protective material 18. With this access, a resilient attachment of the apical support member 12 to the upper central truss member 30 can be made. In this embodiment is shown (more particularly in FIGS. 4 and 5) that such a resilient and weight bearing attachment can be made with a drawbar spring 32, although other weight-bearing resilient attachment means are available and may be substituted for the drawbar spring of the currently described embodiment without departing from the scope of the invention. Attachment of the drawbar spring 32 to the apical support member 12 may be accomplished by use of a second biased ring closure 34 such as the previously described ring closure 24. In at least one preferred embodiment, this second biased ring closure 34 is permanently linked to the drawbar spring 32 by a chain link 36. In this embodiment, attachment of the upper end of the drawbar spring 32 to the upper central truss member 30 is accomplished by means of a bolt-link or shackle arrangement 38. Other means of linkage attachment are possible and known to those skilled in the art.

In at least some preferred embodiments, the apical support member 12 is received within a centrally disposed elongate apical sleeve 17 that runs substantially the length of one surface of the protective material, thereby forming the apex of the cover 10. The apical sleeve 17 could be formed for example from an elongate piece of the same protective material 18 as used in cover 10, that is attached to the underside or the top of the rectangular protective material 18.

In other embodiments, the apical sleeve 17 is formed of strips of the same protective material attached to the underside or the top of the rectangular protective material 18. In some preferred embodiments, the strips of material which may be about 6 to about 10 inches long. In one preferred embodiment, the strips are 8 inches long and about 8 strips are attached along the length of the cover to retain the apical support member. This embodiment requires less material to hold the apical support member in place than the previously described apical sleeve 17.

Figure 9:
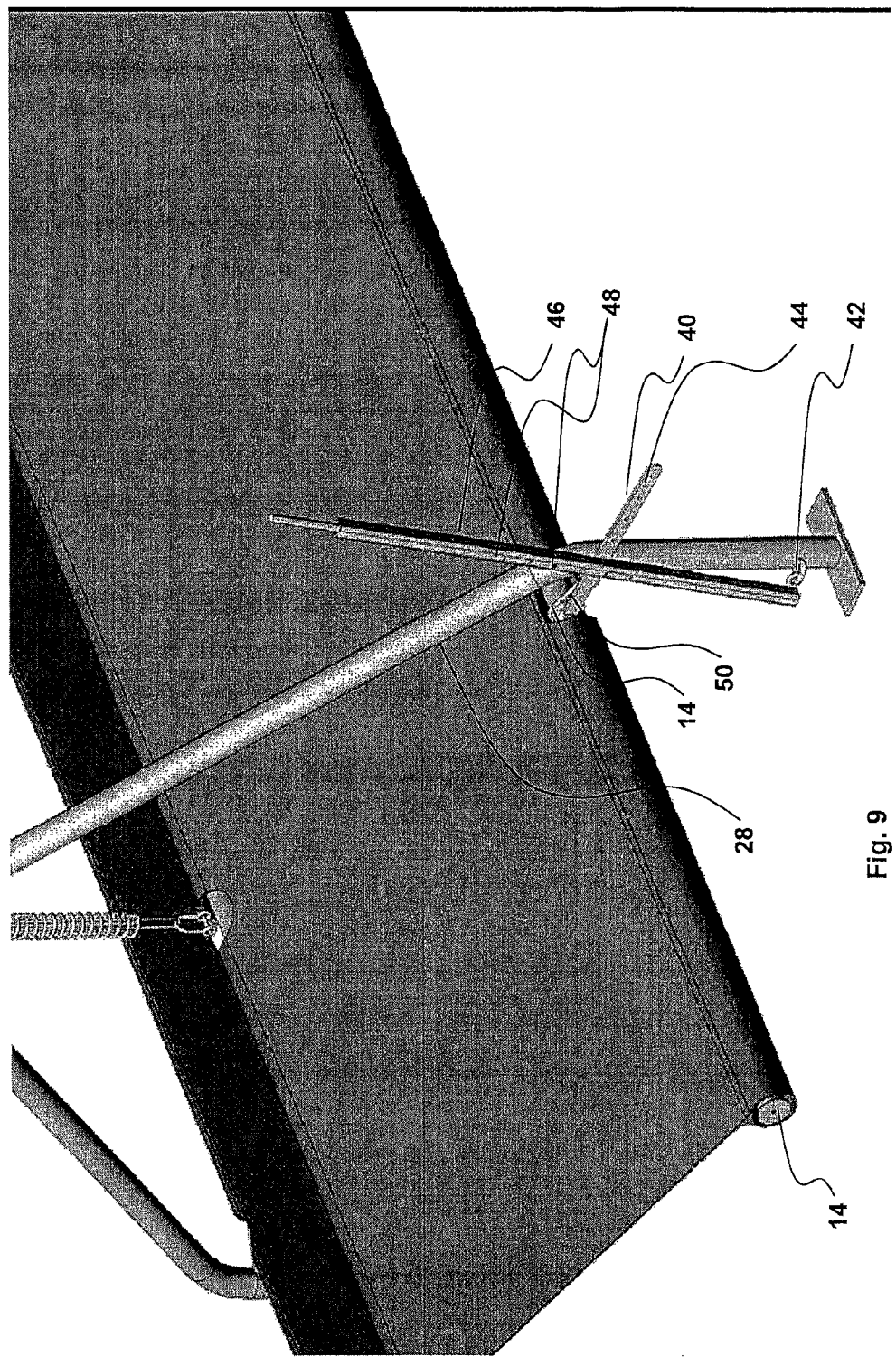
FIG. 9 is an enlarged perspective view of adjustable means for adjusting and mounting the parallel support members.

Referring now to FIG. 9, there is illustrated an optional preferred tensioning and mounting arrangement according to the present invention; in this arrangement, attachment means indicated generally by reference numeral 40 are used to position and attach lateral conveyor truss members 28 to supporting foot portions 42 (or alternatively to a conveyor frame member). The attachment means 40 can operate in conjunction with the parallel support members 14 in order to stabilize and/or position such members in a desired configuration.

The attachment means 40 includes a pair of connected arms 44 and 46, each of which may be provided with a plurality of apertures 48 to enable the arms to be interconnected via a suitable pin (or alternatively a screw or a bolt arrangement). Arms 44 and 46, thus provide a range of adjustments by movement of one arm relative to the other. The bottom end of arm 46 can be provided with suitable means e.g. a chain or link, to connect and/or position its lower end relative to the foot portion 42, once the system has been adjusted to the desired position.

The arm 44 is connected at one end to the parallel support member with e.g. a tubular clip or the like 50 in order to create the desired tensioning on the cover, when the arms 44 and 46 are adjusted relative to each other.

According to at least some preferred embodiments, a kit of parts for assembly of the protective cover 10 is provided. The kit contains parts for assembly of one or more sectional protective covers 10 that can be adapted to various lengths of conveyor trusses. The kit of parts includes as major components, the apical support member 12, the parallel support members 14, and the rectangular sheet of protective material 18. The kit optionally contains fasteners such as the drawbar spring 32 and eye hook 22 described above. The kit of parts may include instructions for deployment of the protective cover within a conveyor truss and such instructions may provide directions to install a series of protective covers along the length of any given conveyor truss. A preferred embodiment of deployment of such a series of protective covers is shown in FIG. 2 where a conveyor truss 11 is depicted which has five protective covers 10a, 10b, 10c, 10d and 10e. These five protective covers, installed in series are necessary to cover the entire length of the conveyer belt within the conveyor truss 11. Fewer covers would be necessary for a shorter conveyor truss and more covers would be necessary for a longer conveyor truss. In one preferred embodiment, the each protective cover 10 is approximately 24 feet long with support springs 32 and eye hooks 22 being positioned approximately every 8 feet, however these dimensions and other dimensions cited above are provided as non-limiting examples only as actual dimensions can vary depending on specific applications and configurations.

In at least some preferred embodiments, the protective cover described herein can be constructed from lightweight, inexpensive and common materials and solve the aforementioned problems by providing a simple, modular system that can be adapted to various lengths of different types of conveyor trusses that form part of various different types of bulk materials handlers.

Although the above description has focused on the protective cover being deployed within a truss conveyor assembly of a bulk materials handler, it will be appreciated that this protective cover could be used within other conveyor assemblies used for other purposes.

While various embodiments of this invention have been illustrated in the accompanying drawings and described above, it will be evident to those skilled in the art that various changes could be made without departing from the spirit and scope of the invention. All such modifications and variations are believed to be within the scope of the invention as defined by the claims appended hereto.

The invention claimed is:

1. A removable protective cover for deployment over a conveyor belt, said protective cover comprising:
   (a) a plurality of individual flexible rectangularly shaped sheet members having longitudinal ends and free transverse side edges, the side edges of each rectangularly shaped sheet member being adapted to be, at their respective longitudinal ends, in juxtaposition with one another to form a substantially continuous cover for covering said conveyor belt;
   (b) said plurality of sheet members each having a longitudinally extending centrally located support means extending substantially the longitudinal length of each sheet member and with adjacent sheet members having said centrally located support means substantially in alignment with each other;
   (c) individual ones of said sheet members being capable of being removably separated from an adjacent one of said sheet members along at least one transverse side edge of the sheet member to permit access to one section of said conveyor belt on at least one side thereof in the area covered by an individual sheet member;
   (d) a plurality of spaced-apart tensioning support members configured for resilient and tensioning attachment to spaced-apart locations along an upper truss member, each of said tensioning support members being adapted to support spaced-apart sections of said individual sheet members via said upper central truss member, said tensioning support members being positioned above said conveyor belt when said cover is deployed over said conveyor;
   (e) a pair of parallel support members, each configured for fixed attachment to a frame member;
   (f) said tensioning support members and said parallel support members together forming a triangular geometry to define a supporting arrangement over said conveyor belt when said cover is deployed; and
   (g) said rectangular sheet members having a means for attachment of opposite sides thereof to a corresponding member of said pair of parallel support members, said rectangular sheet members being centrally retained at an apex of said triangular support arrangement by said tensioning support member to form a triangular cover structure disposed above said conveyor belt when said cover is deployed.

2. The protective cover of claim 1 wherein said tensioning support member and said pair of parallel support members are tubular members.

3. The protective cover of claim 1 wherein said rectangularly shaped sheet members have a plurality of apical openings to expose said tensioning support members when said cover is deployed, said apical openings providing access to said tensioning support members for resilient attachment to said upper central truss member.

4. The protective cover of claim 1 wherein said resilient attachment to said upper central truss member comprises a constant tensioning system.

5. The protective cover of claim 1 wherein said means of attachment of said rectangular sheet members comprise parallel sleeves formed in and disposed along the opposing lengths of said rectangular sheet members, said parallel sleeves configured for insertion of said tubular members.

6. The protective cover of claim 5 wherein said rectangular sheet members have a plurality of side openings in each of said parallel sleeves, said side openings providing access to said parallel support members for said fixed attachment of said parallel support members to opposite lateral conveyor truss members.

7. The protective cover of claim 6 wherein said parallel support members have a plurality of eye-hooks attached thereto, said protective cover having opposite lateral conveyor truss members with rings attached thereto, and said fixed attachment is made by hooking eye hooks to rings.

8. The protective cover of claim 1 wherein said rectangular sheet members are centrally retained at an apex by stretching of said rectangular sheet over said support members.

9. The protective cover of claim 1 wherein said rectangular sheet members are centrally retained at said apex by insertion of said support members into an apical sleeve centrally disposed in said rectangular sheet members.

10. The protective cover of claim 9 wherein said apical sleeve is on the inner surface of said rectangular sheet members and said support members form an apex below said protective sheet.

11. The protective cover of claim 10 wherein said apical sleeve is on the outer surface of said rectangular sheet members and said apical support members form an apex above said protective sheet.

12. The protective cover of claim 1 wherein said frame member is a conveyor truss which is a triangular truss and an apical support member which is configured for spring-biased attachment to a truss member located at the apex of said triangular support arrangement.

13. The protective cover of claim 12 wherein said conveyor truss is a rectangular truss that includes a truss member for mounting centrally above said conveyor belt and wherein said apical support member is configured for spring-biased attachment to said centrally disposed truss member.

14. The protective cover of claim 13 wherein the angle formed between the planes defined by the apical support member and the two parallel support members creates an obtuse angle.

15. The protective cover of claim 1, further including a tensioning and mounting means adapted to tension said protective cover laterally of a conveyor system, said tensioning and mounting means comprising a pair of arms rotatably connected to one another, one arm being fixedly secured to each of said parallel support members, the other arm being adapted to be attached to a conveyor truss member.

16. A protective cover for deployment over a conveyor belt of a bulk materials handler, said protective cover comprising:
    an apical support member configured for resilient attachment to an upper, central truss member of said conveyor truss, said apical support member hanging above said conveyor belt when said cover is deployed;
    a pair of parallel support members, each configured for fixed attachment to opposite lateral conveyor truss members, said apical support member and said parallel support members together forming a triangular arrangement of support members within said conveyor truss when said cover is deployed; and
    a rectangular sheet of protective material having a means for attachment of opposite sides thereof to a corresponding member of said pair of parallel support members, said rectangular sheet centrally retained at an apex by said apical support member to form a triangular cover structure disposed above said conveyor belt when said cover is deployed.

17. A system for protecting bulk materials from exposure during handling comprising:
    a conveyor belt-driven bulk materials handler with a conveyor truss; and
    a protective cover as claimed in claim 1, said protective cover deployed above said conveyor belt within the interior of said conveyor truss.

18. The system of claim 17 wherein said conveyor truss has external projecting members extending from the top and opposing sides of said conveyor truss, said protective cover being attached to said projecting members and deployed above said conveyor belt on the outside of said conveyor truss.

* * * * *